D. P. ROBINSON.
CAN CLOSING MACHINE.
APPLICATION FILED OCT. 23, 1911.

1,070,182.

Patented Aug. 12, 1913.
5 SHEETS—SHEET 5.

WITNESSES

INVENTOR
D. P. Robinson
By Sturtevant & Mason
Attorneys

UNITED STATES PATENT OFFICE.

DANIEL P. ROBINSON, OF BALTIMORE, MARYLAND, ASSIGNOR, BY MESNE ASSIGNMENTS, TO CONTINENTAL CAN COMPANY, INC., A CORPORATION OF NEW YORK.

CAN-CLOSING MACHINE.

1,070,182.     Specification of Letters Patent.     Patented Aug. 12, 1913.

Application filed October 23, 1911. Serial No. 656,245.

*To all whom it may concern:*

Be it known that I, DANIEL P. ROBINSON, a citizen of the United States, residing at Baltimore, in the State of Maryland, have invented certain new and useful Improvements in Can-Closing Machines, of which the following is a description, reference being had to the accompanying drawing, and to the letters and figures of reference marked thereon.

The invention relates to new and useful improvements in can closing machines, and more especially to this type of machine for securing a cover to a filled can by a rolled double seam.

An object of the invention is to provide means for removing a cover from a stack holder, which means also operates to place the cover on the filled can body and clench said cover to the can body, whereby it is securely held thereon, so that the covered can may be taken to the closing head and the cover permanently secured to the can body.

A further object of the invention is to provide means for placing a cover on a can body, which operates in conjunction with a double seaming mechanism, and is so disposed relative to the double seaming mechanism, as to place the cover on the can body and clench the same to the can body, prior to its being conveyed to the seaming head of the closing machine.

These and other objects will in part be obvious, and will in part be hereinafter more fully described.

In the drawings which show by way of illustration one embodiment of the invention.

The invention is herein shown as applied to a can closing machine consisting of a supporting frame 1, on which is mounted a seaming head 2, carrying seaming rolls 3. This seaming head is rotated and operated from a shaft 4, which is moved up and down by a lever 5, and the shaft 4 is rotated through a gear connection 6, from a shaft 7, in the head of the frame. The lever 5 is raised and lowered from a cam disk 8, which is mounted on a cross shaft 9 geared to the shaft 7. The can bodies or filled cans are fed underneath the seaming head by a drum feed 10. Said drum feed 10 consists of a support on which the filled can bodies rest, and along which they may slide. Said can bodies are moved along the support by a drum 11, which is formed with a spiral thread 12. This thread is wound on the drum in such a manner as to move the filled cans first beneath the cover supplying and clenching station 13, and thence to the seaming head 2. The spiral thread is formed with sections so that the full can remains at rest under the clenching station, sufficiently long for the cover to be applied and clenched thereto, after which the spiral thread again moves the filled cans to the seaming station, where it remains at rest during the seaming operation.

Figure 1:
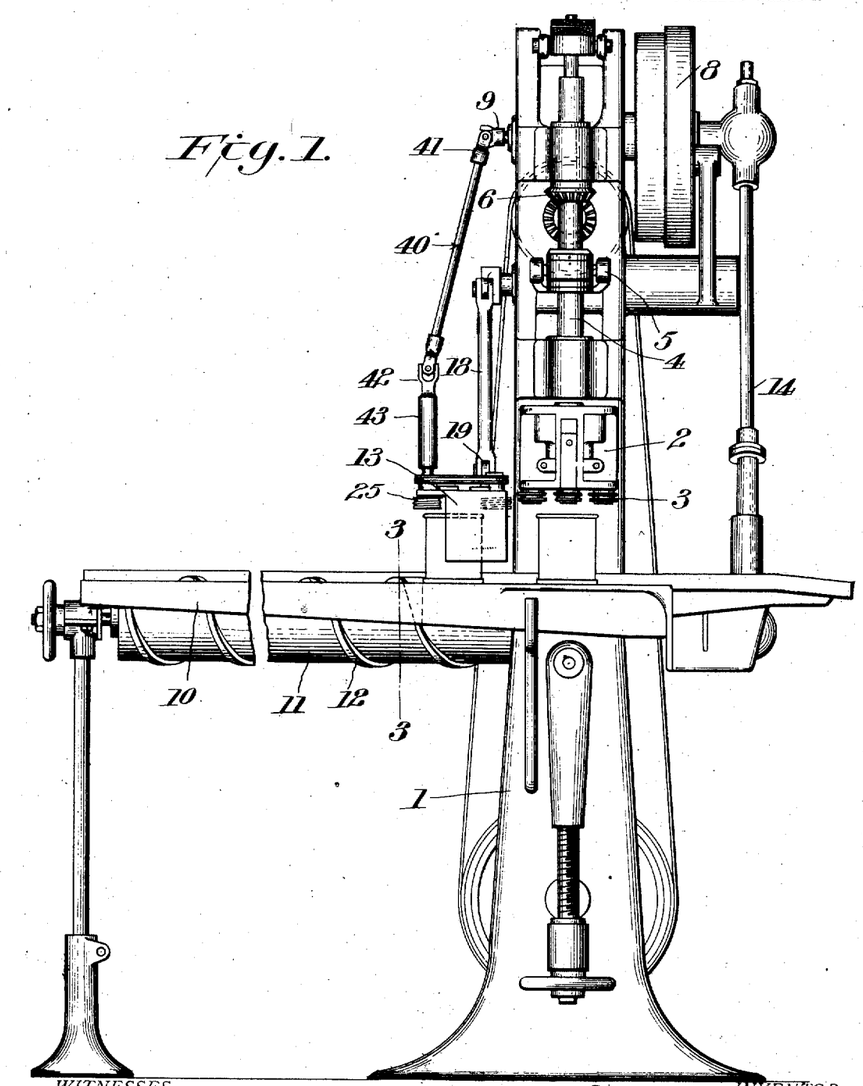
Figure 1 is a front view of a closing machine, having my improvements applied thereto.
Figure 2:
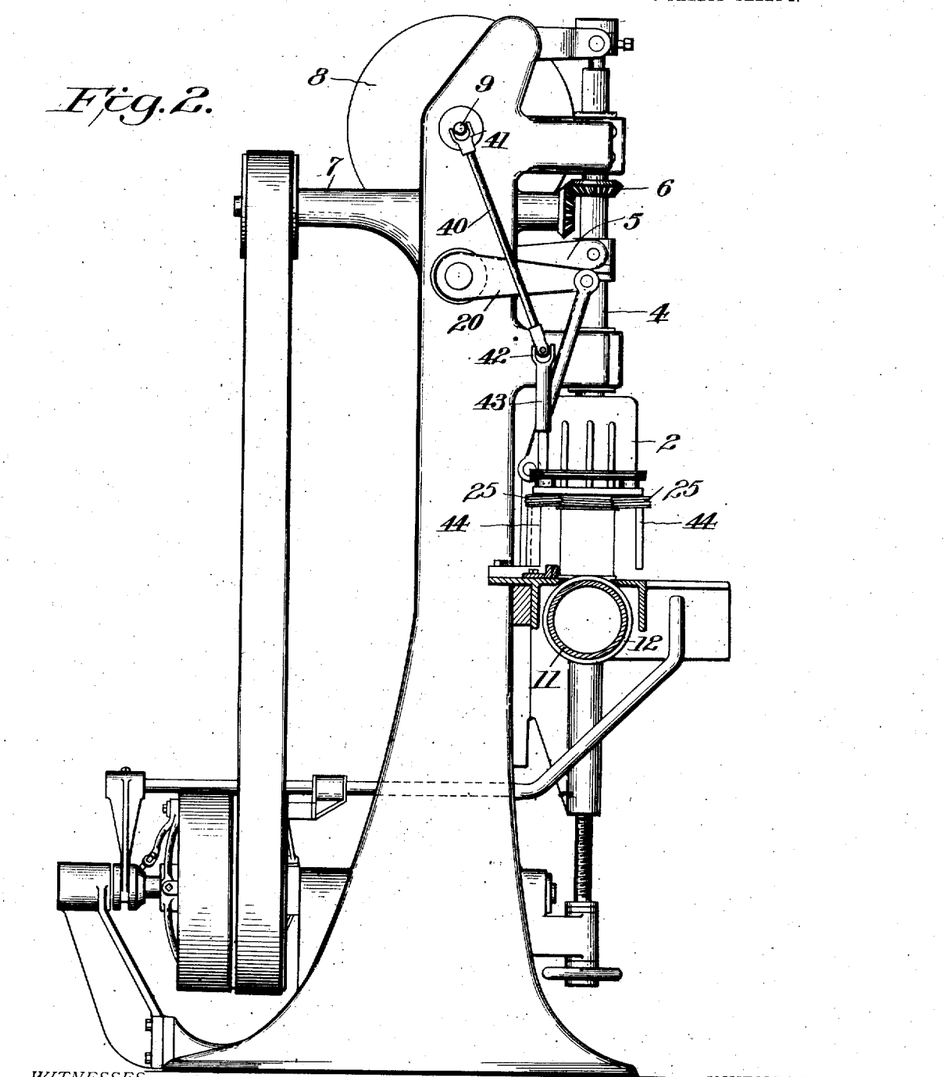
Fig. 2 is a side view of the same.
Figure 3:
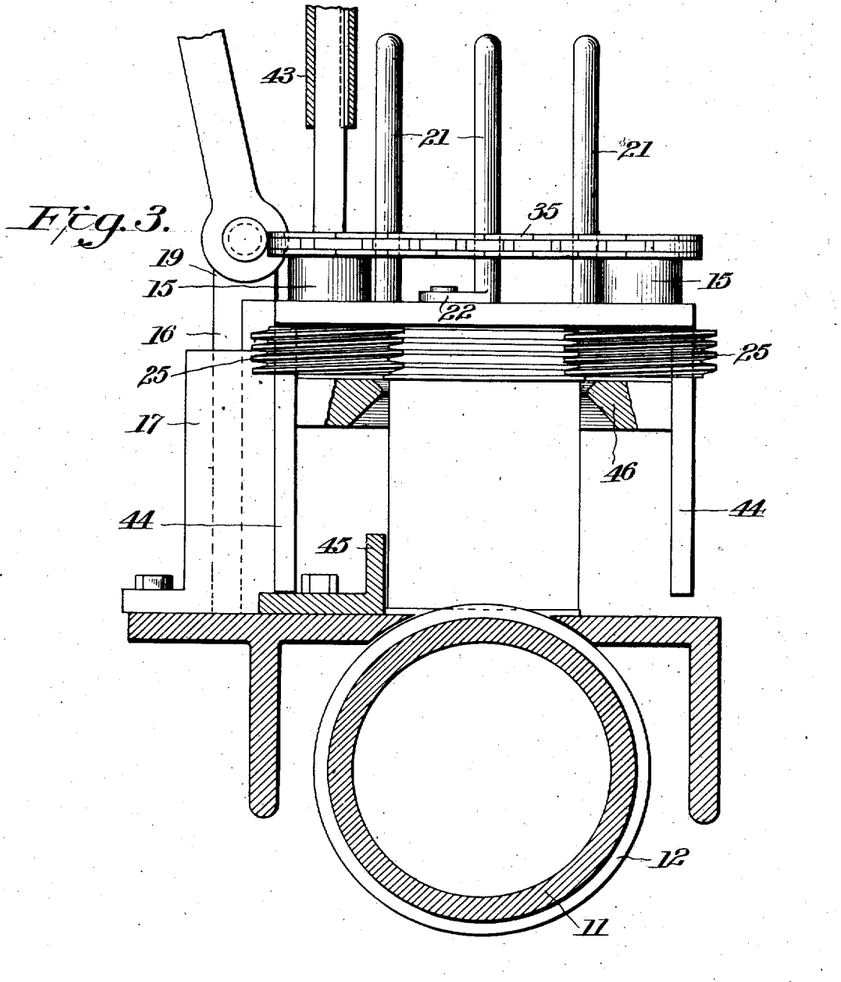
Fig. 3 is a sectional view on the line 3, 3, of Fig. 1, showing the cover applying and clenching mechanism in side elevation.
Figure 4:
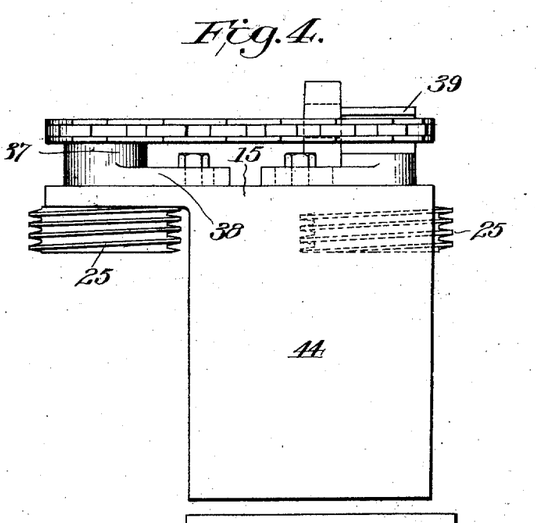
Fig. 4 is a front view of the cover applying and clenching mechanism.
Figure 5:
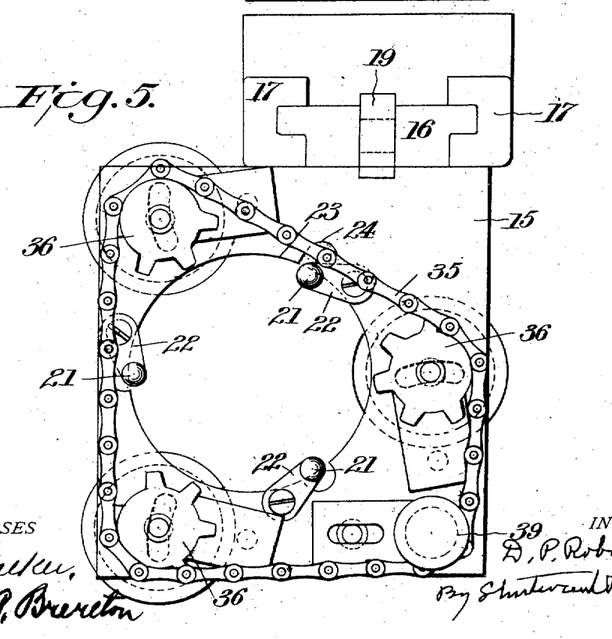
Fig. 5 is a plan view showing the manner of operating the supporting and clenching screws.

The drum 11 is driven by a shaft 14, which is geared to the shaft 9 in the frame of the machine. The cover supplying means consists of a supporting plate 15. This supporting plate is mounted above the drum feed, and is held properly positioned relative thereto by a depending slide 16, (see Fig. 5) which is secured to the plate and is formed with a T head running in suitable grooves and guiding standards 17 molded to the frame of the support for the feeding drum. By this construction, the supporting plate is allowed to move vertically relative to the drum feeding mechanism, and is guided in its vertical movements by the guiding standard 17. Said supporting plate 15 is raised and lowered by a link 18, which is pivoted at its lower ends to an ear 19, formed on the upper face of the supporting plate 15. Said link 18 at its upper end, is pivotally connected to a lever 20, which is mounted on the shaft carrying the lever 5 of the seaming mechanism. This lever 20 will therefore, move in unison with the lever 5, and the cover support and applying means will therefore, move up and down in unison with the seaming head.

Mounted on the support 15, is a stack holder for the covers, which as herein shown, consists of three supporting rods 21. These supporting rods 21, may be carried by arms 22, adjustably attached to the plate 15, so that by swinging the arm 22, the distance between the supporting rods may be varied and therefore, the size of the stack holder changed to accommodate different size covers for can ends. An aperture 23 is formed in the supporting plate 15, and the can covers in the stack holder pass through said aperture to the lower face of the supporting plate. This aperture 23 will be made of sufficient size to accommodate the largest can cover on which the machine is adapted to operate, and if desired, the rods 21 forming the stack holder, may extend through the arms 22 to the lower face of the plate, in which case, the plate would be slotted as at 24, to allow the adjustment of the arms.

At the lower face of the supporting plate 15, I have provided receiving and applying screws 25. As herein shown, I have provided three screws 25, equally spaced about the aperture in the supporting plate 15. These screws have their threads formed a sufficient distance apart to receive the preliminary curled edge of a cover. These screws project underneath the stack holder so that the covers in the stack holder will rest on the upper faces of the three screws. Upon the rotating of these screws, the lower cover in the stack holder will be separated from the remaining covers in the stack holder, and carried downwardly by the screws. At each rotation of the screws a cover will be taken from the stack holder, and therefore, several covers will be supported and carried down by the screws, one after another. This screw feeding means for removing a cover from a stack holder, forms no part of the present invention *per se*, but is shown and described in the patent to Edwin Norton, No. 968,493, granted August 23rd, 1910. The movement of the supporting plate 15, as above noted, is so timed that the drum of the feeding mechanism will position the can body underneath the plate, and while said can body is held stationary underneath said plate, the supporting plate 15 is moved downward through the swinging of the lever 20, and the link connection 18, and therefore, the cover will be positively carried down on to the can body. It often occurs in closing filled cans, that certain of the fruit will float in the syrup, and therefore, extend above the top of the can. By the construction wherein the cover applying means is raised and lowered, said filled cans with floating fruit therein, may be moved underneath the cover-applying means, and as the head or supporting plate 15 moves downwardly with the cover positively carried thereby, the fruit will be crowded down into the can body and the cover crowded into the mouth of the can body, and firmly seated therein. It often occurs also, that can bodies are slightly out of true and therefore, when a can cover is seated in the can body, if it be released before it is positively joined to the can body by a seam, that the spring of the can body will throw off the cover. The present invention therefore, contemplates not only the placing of the cover forcibly on the filled cans, but also the clenching of the cover to the can body so that it is positively held thereon until it is brought to the seaming mechanism, where it is permanently attached to the can body.

Figure 6:
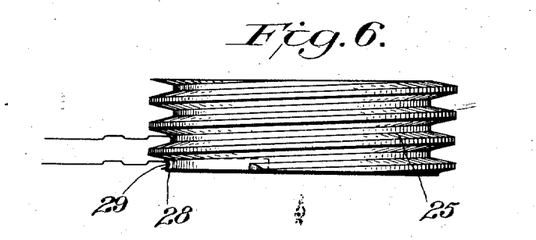
Fig. 6 is a side view showing on a large scale, one of the screws.

The clenching mechanism, as herein shown, is a part of the screws which deliver and place the can cover on the can body. As clearly shown in Figs. 6 and 7, I have formed a radial slot 26 in the lower face of each screw, and in said slot is placed a hardened steel plate 27, which is formed with a projecting lip 28. This projecting lip 28 extends slightly beyond the body of the screw, that is, the base of the threads of the screw, and is formed with a groove 29 in the outer face thereof. Said plate projects a less distance at its forward end than at its rearward end. This plate as the screw rotates, will be brought into contact with the curled edge of the cover, and will force the same at the point of contact with the cover, beneath the projecting flange on the can body, as clearly shown in Figs. 6 and 9.

Figure 9:
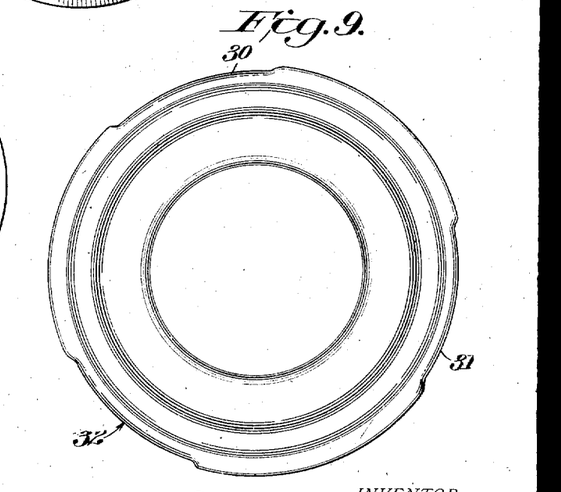
Fig. 9 is an end view of a can body, showing the cover applied and clenched thereto.

As each screw is provided with a clenching member, the cover will be clenched to the can body in three places 30, 31, and 32, as clearly shown in Fig. 9. This clenching of the can body positively holds the cover on the can body. The screw thread at the bottom of the screw, vanishes at the point 33, and as soon as the curling lip 28 is freed from the cover by the rotation of the screw, said screw will be entirely released from the cover so that the supporting plate 15, together with the screws and the stack holder, may be raised from the can body having the cover attached thereto, and said can body again picked up by the thread of the drum feed, and carried to the seaming head, where the curled edge of the cover and flange of the can body are finally rolled into a double seam.

Figure 7:
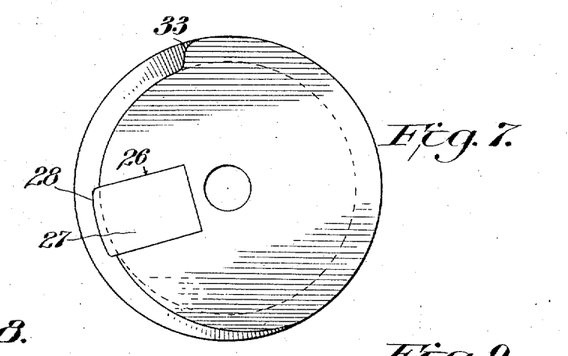
Fig. 7 is an end view of the same.
Figure 8:
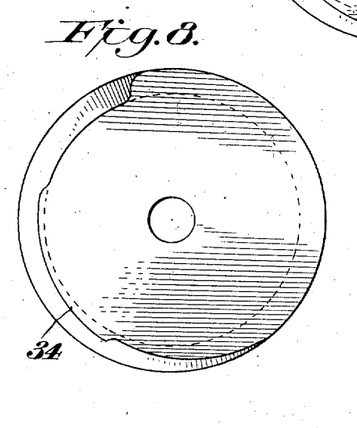
Fig. 8 is an end view of a screw showing a slightly modified form thereof.

Instead of providing the screw with a separate plate for forming a curling lip, I may form the curling lip integral with the screw, as shown at 34 in Fig. 8, but as the separate plate construction is much more easily manufactured, I prefer to use the construction shown in Fig. 7.

The screws 25 are rotated simultaneously by a chain 35, which chain engages a pinion 36 carried by a short shaft on which each screw is mounted. The short shaft for the screws, as herein shown, is mounted in a bearing 37, which is attached to an arm 38 secured to the supporting plate 15. Said plate may be slotted and said arms may be swung about their connections so as to vary the position of the screws relative to each other, for different size covers. The slack in the chain is taken up by an idler 39. The shaft for one of the screws 36 is positively rotated from the shaft 9 of the seaming mechanism, through a shaft 40 which has a universal connection 41 with the shaft 9, and a universal connection 42 with a sleeve 43, telescoping the shaft carrying the screw. Said sleeve 43 is splined to the shaft of the screw, so that said screw will be positively rotated from the shaft of the seaming machine, but said screw may be moved vertically relative to its operating mechanism. This allows the supporting plate carrying the screws and the covers to move up and down as above noted, and the screws to rotate continuously. At each side of the supporting plate are downwardly projecting flanges 44, which flanges terminate short of the support for the drum feed when the supporting plate 15 is in its lowered position. The flanges 44 are merely extended along the sides of the plate 15, and do not interfere with the feeding of a can body underneath the supporting plate, and from beneath the supporting plate to the seaming head. The can body is positioned underneath the stack holder by a guiding flange 45, and the thread on the drum.

In order to assist in rounding up the can bodies which may be considerably distorted, a ring 46 is secured to the depending flanges 44, at a point beneath the screws 25. This ring is formed with a tapered opening so that as the supporting plate 15 is lowered, the tapered opening will receive the can body and round up the same to a certain extent, so that the cover may be forcibly seated in said can body. The opening through the ring 46, is of course, sufficiently large to allow the flange on the can body to readily pass therethrough, and also to allow the can body with the cover clenched thereon, to pass through the ring. Both the upper and lower edges are slightly tapered to prevent said ring from locking with the can body or with the cover.

In the operation of the device, the filled cans are placed on the support and the spiral thread on the drum moves the cans along the support underneath the cover applying and securing means. At this point, the thread in the drum is so shaped that the can body is given a dwell. The supporting plate carrying the stack of can covers, will move down over the filled cans, and the ring carried thereby will round up the filled can to receive the cover. The cover which has been carried down by the screws, which of course, are operated in proper timing with the other parts of the machine, will be forcibly pushed down on to the can body, crowding the fruit floating therein into the can body, and firmly seat the cover in the can body, after which the clenching lips carried by each screw will turn the curl of the cover underneath the flange on the can body at the points where the cover is supported by the screw. As soon as the clenching occurs, the cover is released from the screw, and the supporting plate with the stack holder and screws is raised from the filled can with the cover attached, and the ring is also lifted above the filled can, after which the thread on the drum will again pick up the can and move it along to the seaming head. While the seaming action occurs on one can, another can is having the cover applied thereto and clenched.

It is obvious that minor changes in the details of construction, and the arrangement of parts may be made, without departing from the spirit of the invention as set forth in the appended claims. It is also obvious that instead of using drum feeds as herein shown, any suitable feeding mechanism may be used for presenting the filled cans to the cover placing and clenching mechanism, and to the head seaming mechanism.

Having thus particularly described my invention, what I claim as new and desire to secure by Letters Patent, is:—

1. A can closing machine including in combination, a support for can bodies, a stack holder for can covers, and devices for removing a cover from the stack, placing the same on a can body, said devices having means for clenching the cover to the can body.

2. A can closing machine including in combination, a support for can bodies, a stack holder for can covers, and continuously operating devices for removing a cover from the stack, placing the same on the can body, said devices having means for clenching the cover to the can body.

3. A can closing machine including in combination, a support for can bodies, a stack holder for can covers, and a plurality of screws for receiving the can covers from the stack holder and placing the same on the can body, said screws having means for clenching the covers to the can body.

4. A can closing machine including in combination, a support for can bodies, a stack holder for can covers, a plurality of screws for receiving the covers from the stack holder and placing the same on the can body, said screws having means for clenching the cover to the can body, and means for continuously rotating said screws.

5. A can closing machine including in combination, a support for can bodies, a stack holder for can covers, a plurality of screws for receiving the can covers from the stack holder and placing the same on the can body, said screws having means for clenching the covers to the can body, and means for raising and lowering the screws for positively seating the cover carried thereby in the can body.

6. A can closing machine including in combination, a support for can bodies, a stack holder for can covers, a plurality of screws for receiving the covers from the stack holder, and placing the same on the can body, said screws having means for clenching the cover to the can body, means for continuously rotating said screws, and means for raising and lowering the screws for positively seating the cover in the can body.

7. A can closing machine including in combination, a support for can bodies, a stack holder for can covers, a plurality of screws for receiving the covers from the stack holder, means for rotating the screws, and means for raising and lowering the screws for positively placing the cover on the can body and seating the same therein.

8. A can closing machine, including in combination, a support for can bodies, a stack holder for can covers, a plurality of screws for receiving the covers from the stack holder, means for rotating the screws, means for raising and lowering the screws for positively placing the cover on the can body and seating the same therein, and means for clenching the cover to the can body.

9. A can closing machine including in combination, a support for can bodies, a stack holder for can covers, a plurality of screws for receiving the covers from the stack holder and placing the same on the can body, and said screw carrying means for clenching the covers to the can bodies.

10. A can closing machine including in combination, a support for can bodies, a stack holder for can ends, a plurality of screws for receiving the covers from the stack holder and placing the same on the can body, and means for rotating the screws, means for rounding up the can body, means for raising and lowering the screws relative to the support, whereby the cover is seated in the can body, and means for clenching the cover to the can body.

11. A can closing machine including in combination, a seaming head, and means operating in unison therewith for applying a cover to a can body and temporarily securing the same thereto, comprising a stack holder, a support therefor, a plurality of screws for receiving the covers from the stack holder and placing the same on the can bodies, means for clenching the cover to the can body, and means for feeding the can bodies in succession to the cover applying means, and the seaming head.

12. A can closing machine including in combination, a support, means for feeding the can bodies along said support, a seaming head, means for raising and lowering the seaming head, means moving up and down with the seaming head for applying a cover to the can body, and temporarily securing the same thereto, said cover applying means being located at one side of the seaming head, and comprising a plurality of screws, means for feeding covers to said screws whereby the cover is placed on the can body by the screws, and means carried by the screws for clenching the can cover to the can body.

13. A can closing machine including in combination, a seaming head, means for operating the same, a feeding mechanism for feeding cans to the seaming head, a cover applying means located at one side of the seaming head, and comprising a supporting plate, a stack holder carried thereby, a plurality of screws mounted on said supporting plate, means for operating the screws from the seaming mechanism, and in unison therewith, means for raising and lowering the supporting plate from the seaming mechanism, whereby the covers may be received by the screws and seated in the can bodies, and means carried by each screw for clenching the cover to the can body.

14. A can closing machine including in combination, a seaming head, means for operating the same, a feeding mechanism for feeding cans to the seaming head, a cover applying means located at one side of the seaming head, and comprising a supporting plate, a stack holder carried thereby, a plurality of screws mounted on said supporting plate, means for operating the screws from the seaming mechanism and in unison therewith, means for raising and lowering the supporting plate from the seaming mechanism, whereby the covers may be received by the screws and seated in the can bodies, and a projecting lip carried by each screw for engaging the curl on the cover for clenching the same to the can body.

15. A can closing machine including in combination, a seaming mechanism and means for covering a can body and presenting the same to the seaming mechanism, comprising a support for the covers, a plurality of screws for receiving the covers, placing the same on the can bodies, and for clenching the covers to the can bodies.

In testimony whereof I affix my signature, in presence of two witnesses.

DANIEL P. ROBINSON.

Witnesses:
JOHN W. HEWES,
RALPH H. ALEXANDER.

Copies of this patent may be obtained for five cents each, by addressing the "Commissioner of Patents, Washington, D. C."

---

Correction in Letters Patent No. 1,070,182.

It is hereby certified that in Letters Patent No. 1,070,182, granted August 12, 1913, upon the application of Daniel P. Robinson, of Baltimore, Maryland, for an improvement in "Can-Closing Machines," an error appears in the printed specification requiring correction as follows: Page 3, lines 118 and 126, after the word "stack," strike out the comma and insert the word *and;* and that the proper corrections have been made in the files and records of this office and are hereby made in said Letters Patent.

Signed and sealed this 2nd day of September, A. D., 1913.

[SEAL.]

THOMAS EWING,

*Commissioner of Patents.* by the screws and seated in the can bodies, and a projecting lip carried by each screw for engaging the eurl on the cover for clenching the same to the can body.

15. A can closing machine including in combination, a seaming mechanism and means for covering a can body and presenting the same to the seaming mechanism, comprising a support for the covers, a plurality of screws for receiving the covers, placing the same on the can bodies, and for clenching the covers to the can bodies.

In testimony whereof I affix my signature, in presence of two witnesses.

DANIEL P. ROBINSON.

Witnesses:
JOHN W. HEWES,
RALPH H. ALEXANDER.

Copies of this patent may be obtained for five cents each, by addressing the "Commissioner of Patents, Washington, D. C."

---

Correction in Letters Patent No. 1,070,182.

It is hereby certified that in Letters Patent No. 1,070,182, granted August 12, 1913, upon the application of Daniel P. Robinson, of Baltimore, Maryland, for an improvement in "Can-Closing Machines," an error appears in the printed specification requiring correction as follows: Page 3, lines 118 and 126, after the word "stack," strike out the comma and insert the word *and;* and that the proper corrections have been made in the files and records of this office and are hereby made in said Letters Patent.

Signed and sealed this 2nd day of September, A. D., 1913.

[SEAL.]

THOMAS EWING,
*Commissioner of Patents.*

Correction in Letters Patent No. 1,070,182.

It is hereby certified that in Letters Patent No. 1,070,182, granted August 12, 1913, upon the application of Daniel P. Robinson, of Baltimore, Maryland, for an improvement in "Can-Closing Machines," an error appears in the printed specification requiring correction as follows: Page 3, lines 118 and 126, after the word "stack," strike out the comma and insert the word *and;* and that the proper corrections have been made in the files and records of this office and are hereby made in said Letters Patent.

Signed and sealed this 2nd day of September, A. D., 1913.

[SEAL.]

THOMAS EWING,
*Commissioner of Patents.*